United States Patent [19]

Kubota et al.

[11] Patent Number: 4,501,397
[45] Date of Patent: Feb. 26, 1985

[54] METHOD OF STABILIZING FLIGHT OF A FLYING BODY AND FLIGHT-STABILIZED FLYING BODY

[75] Inventors: Hirotoshi Kubota; Akira Takano, both of Tokyo; Isao Arai, Soka; Masayoshi Matsuzaka, Tokyo, all of Japan

[73] Assignee: University of Tokyo, Tokyo, Japan

[21] Appl. No.: 434,072

[22] Filed: Oct. 12, 1982

[30] Foreign Application Priority Data

Jan. 9, 1982 [JP] Japan ............................ 57-1353

[51] Int. Cl.³ ............................................ B64C 17/00
[52] U.S. Cl. .................................. 244/75 R; 244/3.1; 244/3.24
[58] Field of Search ............................... 244/198–200, 244/130, 34 A, 119, 75 R, 3.24, 3.23, 3.1, 14; 114/67 R; 102/501, 490, 374, 347

[56] References Cited

U.S. PATENT DOCUMENTS

| | | | |
|---|---|---|---|
| 2,134,260 | 10/1938 | Nickerson | 244/119 |
| 2,739,770 | 3/1956 | Fanti et al. | 244/200 |
| 2,918,229 | 12/1959 | Lippisch | 244/34 A |
| 3,075,489 | 1/1963 | Eichenberger | 244/130 |
| 3,076,725 | 2/1963 | Boggs | 244/130 |
| 3,588,005 | 6/1971 | Rethorst | 244/200 |
| 4,225,102 | 9/1980 | Rao | 244/130 |

FOREIGN PATENT DOCUMENTS

| | | | |
|---|---|---|---|
| 669897 | 1/1939 | Fed. Rep. of Germany | 244/130 |
| 782950 | 9/1957 | United Kingdom | 244/34 A |

*Primary Examiner*—Galen L. Barefoot
*Attorney, Agent, or Firm*—Sughrue, Mion, Zinn, Macpeak & Seas

[57] ABSTRACT

A method of stabilizing flight of a flying body having a circular cross-section by the use of a plurality of tripping wires, when the flying body flies in an air current at a high angle of attack with respect to the air current. And also a flight-stabilized flying body having a circular cross-section, comprising at least two tripping wires attached to the periphery of said flying body. The tripping wires are attached to the outer periphery of the flying body, by which an asymmetric side force acting on the flying body is reduced, thereby suppressing bad motion of the flying body, such as, rotation around the center of gravity of the flying body in a plane of an attack angle, i.e. the flat spin, yawing and the like motion. In a case of attaching two tripping wires to the flying body, an optimal angle of wire attachment for suppressing the undesirable motion resides in a region from 60° to 45° for the non-dimensional wire height of a region from 0.007 to 0.014. In a case of attaching more than two tripping wires to the flying body, an optimal distance of angle between adjacent two tripping wires resides in a region from 15° to 45° for non-dimensional wire height of a region from 0.007 to 0.014 and thus a number of the tripping wires required resides in a region from 24 to 8. In a case of the flying body comprising cylindrical and conical portions, the tripping wires are attached only to the cylindrical portion of the flying body for a Reynolds number region from $2 \times 10^5$ to $4.4 \times 10^5$.

7 Claims, 25 Drawing Figures

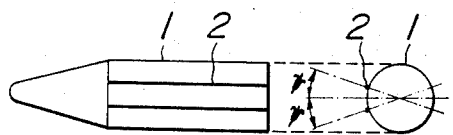
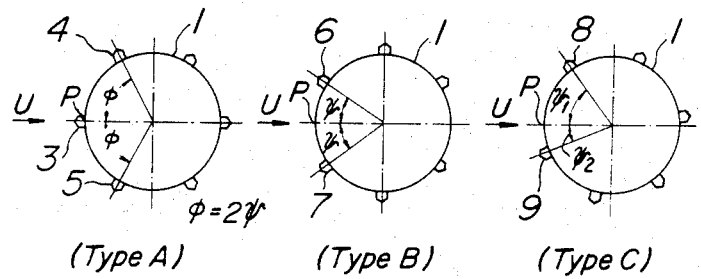

FIG. 3A  30-A (12)  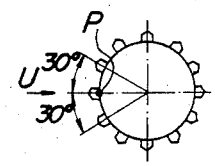
FIG. 3B  60-B (2)  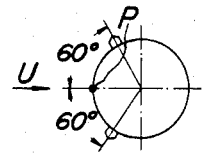
FIG. 3C  $\psi_1 75-\psi_2 15$-C(2)  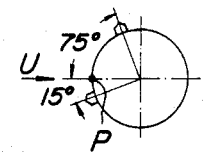
FIG. 4A
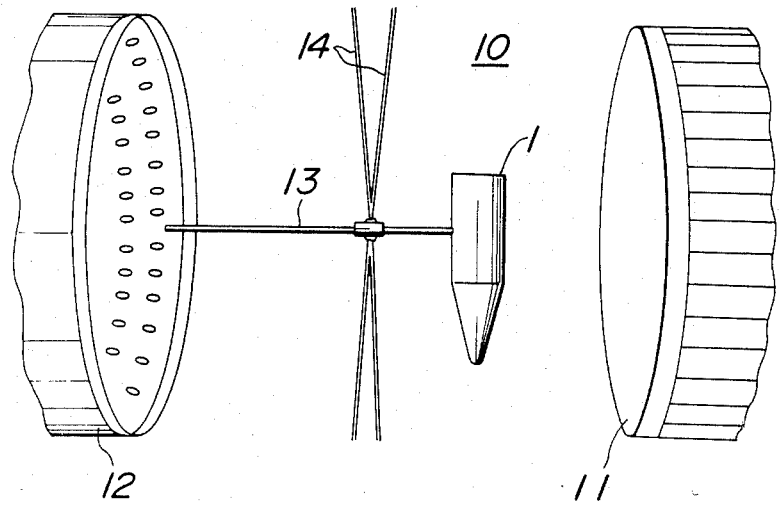
FIG. 4B
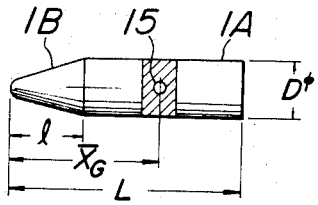
L=800mm, D=210mm
ℓ=305mm, $\overline{X}_G$=550mm

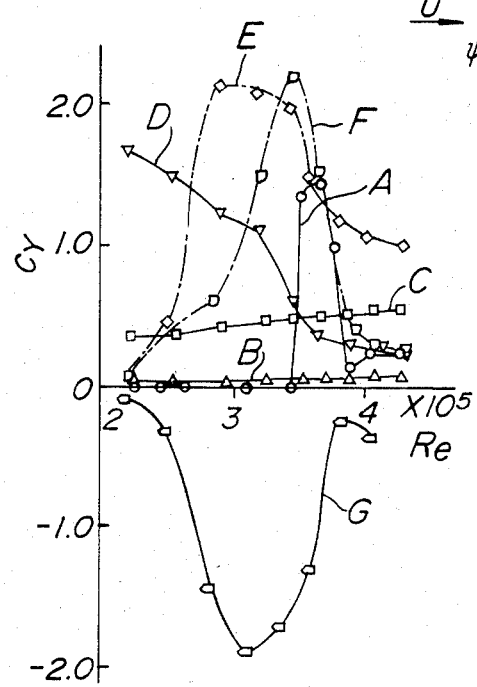
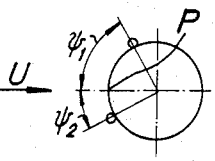
FIG.5A  FIG.5B
A--○ Without Roughness
With Roughness
B--△ ψ 60-B(2)
C--□ ψ₁75-ψ₂45-C(2)
D--▽ ψ₁90-ψ₂30-C(2)
E--◇ ψ₁105-ψ₂15-C(2)
F--▱ ψ₁120-ψ₂0-C(2)
G--◁ ψ₁135-ψ₂(-15)-C(2)
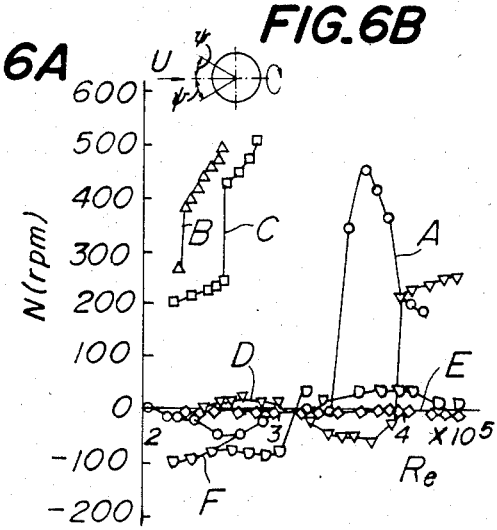
FIG.6A  FIG.6B
A--○ Without Roughness
With Roughness d=0.007
B--△ ψ 30-B(2)
C--□ ψ 35-B(2)
D--▽ ψ 45-B(2)
E--◇ ψ 60-B(2)
F--▱ ψ 80-B(2)

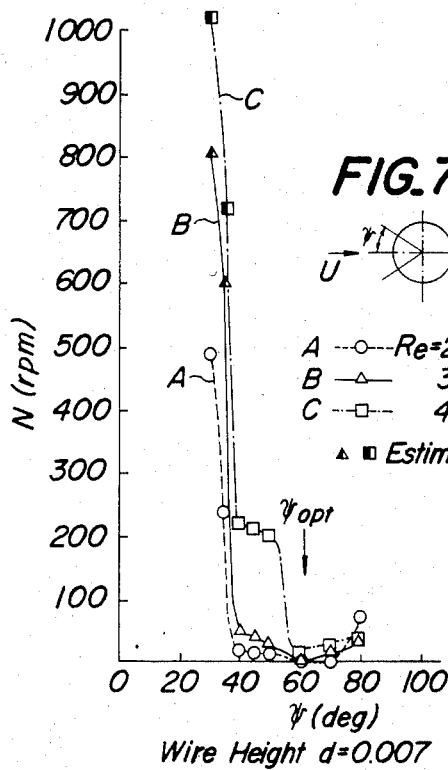
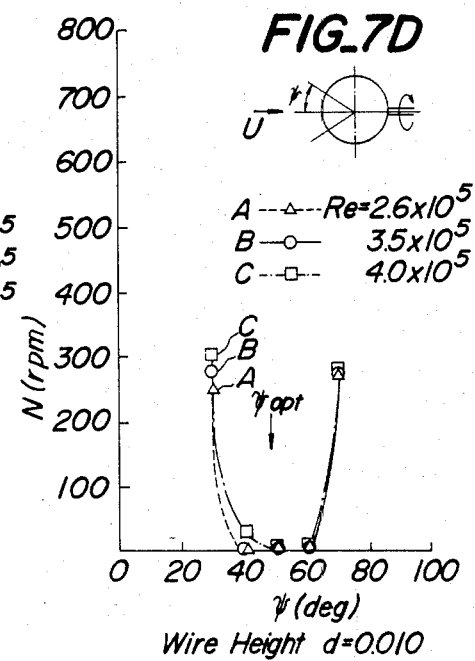
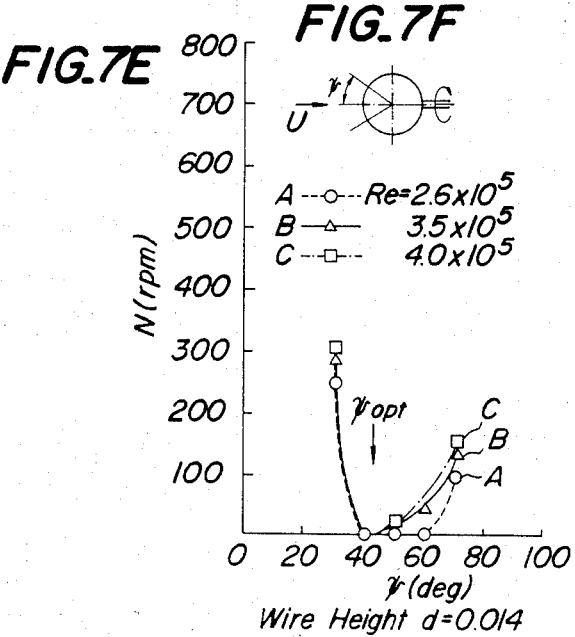
FIG. 7A, FIG. 7B, FIG. 7C, FIG. 7D, FIG. 7E, FIG. 7F

FIG_8A
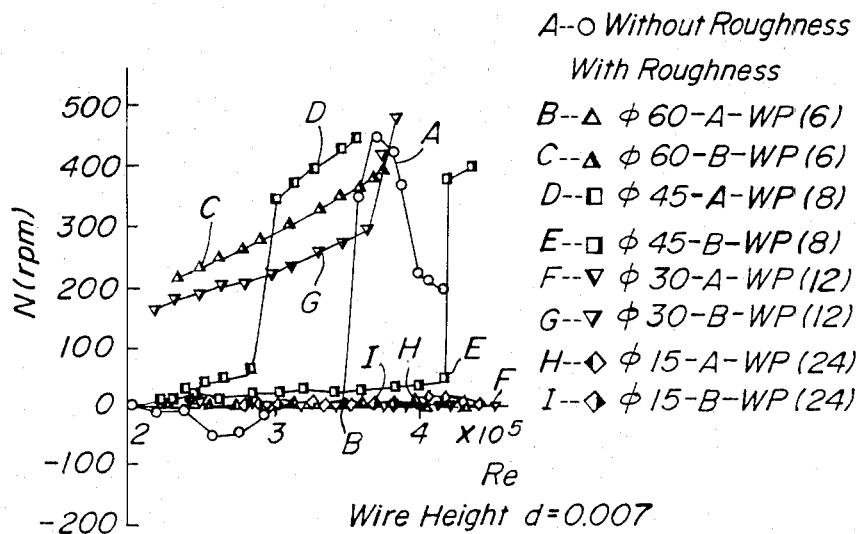
Wire Height d=0.007
FIG_8B
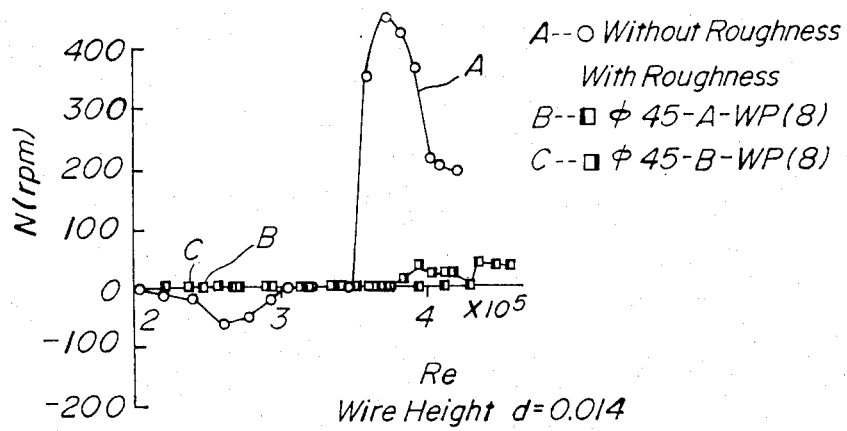
Wire Height d=0.014

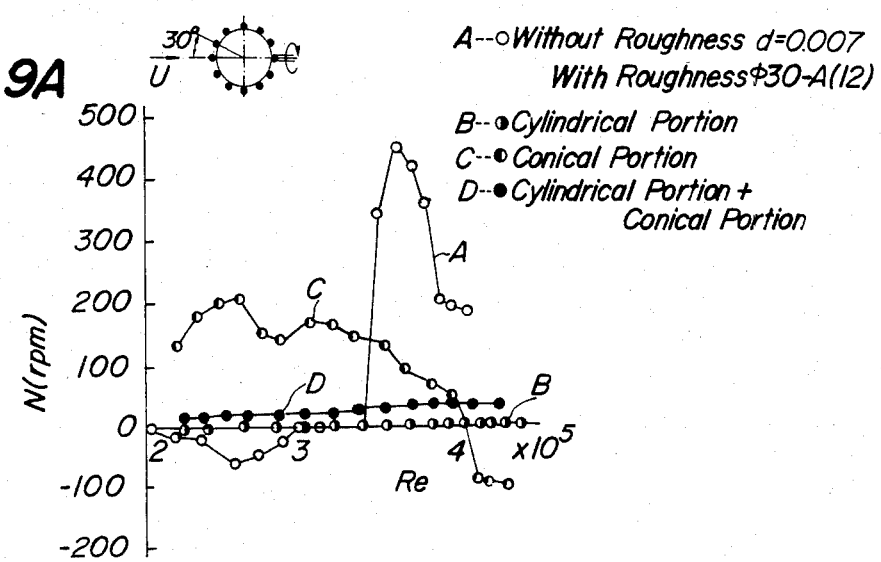
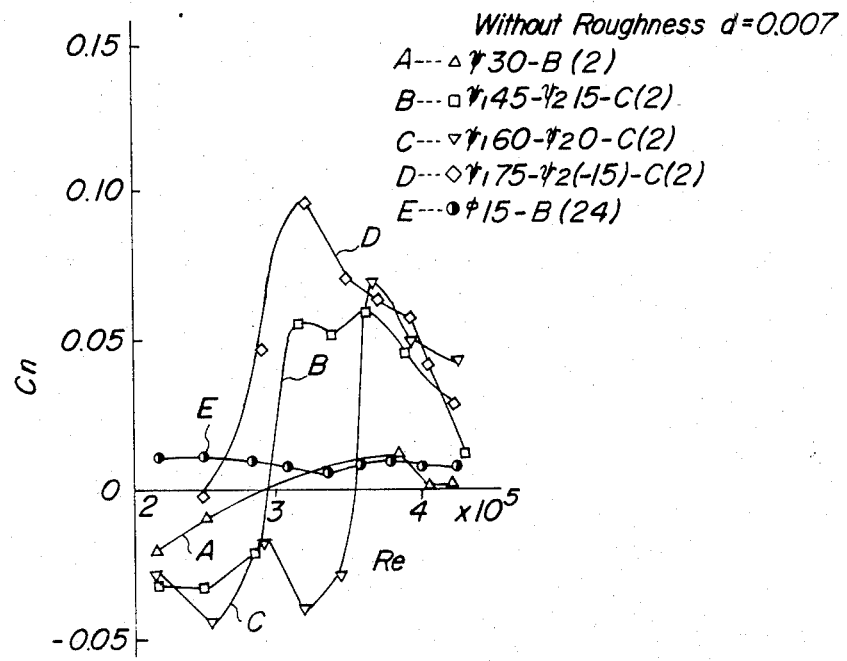

METHOD OF STABILIZING FLIGHT OF A FLYING BODY AND FLIGHT-STABILIZED FLYING BODY

BACKGROUND OF THE INVENTION

Field of the Invention

This invention relates to a method of stabilizing flight of a flying body by reducing asymmetric side force, which occurs when the flying body flies at a high angle of attack with respect to an air current, so as to suppress bad or undesirable motion of the flying body. An example is rotation around the center of gravity of the flying body in a plane of an attack angle, called as flat spin, yawing or the like, due to the asymmetric side force, by means of aerodynamic means.

This invention further relates to a flying body which is stabilized in its flight by aerodynamic means.

The nature of stream of air current flowing along a fuselage of a flying body such as rocket, aircraft, and so on is characterized by a non-dimensional parameter called as a Reynolds number $R_e$. Now assume that, for example, a slender flying body is flying at a high angle of attack with respect to an air current. If the Reynolds number based on a diameter of the flying body resides in a subcritical Reynolds number region which is lower than a critical Reynolds number region of $R_e = 3.4 \times 10^5 - 3.6 \times 10^5$ laminar separation may occur in the stream or flow on left and right sides of the fuselage. If the Reynolds number resides within a supercritical Reynolds number region which is higher than the critical one, turbulent separation may occur in the stream or flow. However, the flow patterns or conditions at the both sides of the fuselage are same, so that any asymmetric side force acting on the flying body does not occur on the fuselage.

If the critical Reynolds number region, short bubbles occur only on the one side of the fuselage and its occurrence continues, and therefore an asymmetric pressure difference appears between the one side and the other side of the fuselage. This asymmetric pressure difference causes the asymmetric side force acting on the fuselage. This fact has been verified from wind tunnel experiments for a two dimensional cylindrical body and a three dimensional body designed in imitation of a head portion of a rocket.

This type of asymmetric side force occurring when the slender flying body flies at high angle of attack, for example, 30°–90° with respect to the air current or stream causes aerodynamically unstable flight of the flying body, rotation thereof in a plane perpendicular to the air current called as flat spin and so on, and therefore such side force is unfavorable to the actual flight of the flying body.

SUMMARY OF THE INVENTION

The asymmetric side force is caused by the difference in flow patterns or conditions around the fuselage of the flying body at the critical Reynolds number region. Thus, in order to reduce the asymmetric side force, an aerodynamic means is required.

This invention is based on the recognition that in order to eliminate the flow difference it is effective to attach at least two tripping wires to the cylindrical portion of a flying body at its outer periphery in parallel with an axis of the cylindrical portion, thereby urging early occurrence of the turbulent separation.

An object of this invention is to provide a concrete method of stabilizing flight of a tubular, slender or elongated flying body having a circular cross-section by reducing an asymmetric side force acting on the flying body and suppressing rotation thereof caused by the side force.

It is heretofore well known that early transition from laminar flow to turbulent flow is attained by the surface roughness, but the method in accordance with the invention is based on results obtained from systematic wind tunnel experiments with the use of tripping wires.

Another object of the invention is to provide that flight-stabilized flying body having a circular cross-section which any bad motion of the flying body such as flat spin, yawing and the like can be suppressed during flight of the flying body.

According to the invention, a method of stabilizing flight of a flying body having a circular cross-section, comprises a step of suppressing undesirable motion of the flying body such as flat spin, yawing and the like, for stable flight of the flying body, by reducing an asymmetric side force occurring when said flying body flies at a high angle of attack with respect to an air current by means of at least two tripping wires provided on the outer periphery of said flying body.

According to the present invention, a flight-stabilized flying body having a circular cross-section, comprises at least two tripping wires provided on the outer periphery of said flying body, thereby reducing an asymmetric side force occurring when said flying body flies at a high angle of attack with respect to an air current so as to suppress bad motion of said flying body such as flat spin, yawing and the like caused by said asymmetric side force.

According to a preferred embodiment of the invention in a case where a number of said tripping wires is two and an initial stagnation point of the air current lies on a midpoint between said tripping wires and on said outer periphery of said flying body, an optimal azimuthal angle for tripping wire position resides in a region from 60° to 45° for non-dimensional tripping wire height normalized by the diameter of said flying body residing in a region from 0.007 to 0.014.

According to another preferred embodiment of the invention, in a case where said tripping wires are provided on said flying body over its whole outer periphery in a manner to be spaced apart from each other by an equal distance of angle, an optimal distance of angle between the adjacent two tripping wires resides in a region from 15° to 45° for non-dimensional tripping wire height normalized by the diameter of said flying body residing in a region from 0.007 to 0.014 and a number of said tripping wires resides in a region from 24 to 8.

According to the further preferred embodiment of the invention, said flying body comprises a cylindrical portion and a conical portion and, for a Reynolds number region from $2 \times 10^5$ to $4.4 \times 10^5$, said tripping wires are only provided on said cylindrical portion.

Further objects and features of the invention will be understood from the following detailed description with reference to the accompanying drawings, wherein:

BRIEF DESCRIPTION OF THE DRAWINGS

FIG. 1A is an elevational view of a flying body in which, by way of example, tripping wires are attached only to its cylindrical portion, for explaining this invention;

FIG. 1B is a side view of the flying body shown in FIG. 1A;

FIGS. 2A-2C are diagrams for explaining this invention, each showing pattern of tripping wires attachment and type of a model of a flying body, viewed in cross-section perpendicular to the longitudinal direction of the flying body;

FIGS. 3A-3C are diagrams for explaining this invention, each showing pattern of tripping wire attachment and notation thereof viewed in cross-section perpendicular to the longitudinal direction of the flying body;

FIG. 4A shows one example of a wind tunnel apparatus for explaining this invention;

FIG. 4B shows a model of a flying body used in the wind tunnel experiments carried out by the apparatus of FIG. 4A;

FIG. 5A is a diagram for explaining this invention and showing results obtained from the wind tunnel experiments, for explaining that the asymmetric side force is suppressed by two tripping wires;

FIG. 5B is a diagram for showing pattern of tripping wire attachment of the flying body model used in the experiment;

FIG. 6A is a graph for explaining this invention and showing wind tunnel experimental results of number of rotation, that is, flat spin rate of a flying body due to the asymmetric side force;

FIG. 6B is a diagram for showing pattern of tripping wire attachment of the flying body used in the experiment;

FIGS. 7A, 7C and 7E are diagrams for explaining this invention, each showing a relationship between flat spin rate and azimuthal angle for attachment of tripping wires in the case where two tripping wires are attached to a flying body so that initial stagnation point is formed on the outer periphery of the body at a midpoint between the two tripping wires;

FIGS. 7B, 7D and 7F are diagrams for showing patterns of tripping wire attachment of the flying bodies used in the experiments, respectively;

FIGS. 8A and 8B are diagrams, each showing a flat spin rate of a flying body when tripping wires are attached to the flying body over its whole outer periphery at various distances of angle between adjacent two tripping wires;

FIG. 9A is a diagram for explaining this invention and showing experimental results for explaining the effect of surface roughness of a conical portion with tripping wires attached thereto on the flat spin rate;

FIG. 9B is a diagram for showing pattern of tripping wire attachment of the flying body used in the experiment; and FIG. 10 is a diagram for explaining this invention and showing static experimental results of angular moment or flat spin moment of a flying body when tripping wires are attached only to the cylindrical portion of the flying body.

DETAILED DESCRIPTION OF THE PREFERRED EMBODIMENTS

FIG. 1A is an elevational view of a flying body consisting of a cylindrical portion and conical portion, the cylindrical portion having two wires attached or mounted thereon, and FIG. 1B is a right side view of the flying body shown in FIG. 1A. In FIGS. 1A and 1B, reference numeral 1 shows a flying body proper and 2 wires attached to an outer periphery on surface of the cylindrical portion of the flying body proper in parallel with an axis of the cylinder. The flying body may be of tubular, elongated, slender or other type. The tripping wire used here is straight one having a constant diameter, thickness, width or height and functions to disturb or trip a boundary layer flowing along the flying body. The tripping wire means not only a so-called wire but also a rod-like one and a pole-like one. Further the shape in cross-section of the tripping wire may be n-sided polygon ($n \geq 3$). Further the tripping wires may be provided on the flying body by connecting means such as rivetting, welding, adhesion, etc. or may be integral with the flying body during manufacturing process.

FIGS. 2A-2C are cross-sectional views of the flying body with a plurality of tripping wires, each having the shape in cross-section of n ($n=5$)-sided polygon, respectively, and also show the patterns of tripping wire attachment, respectively. In each of FIGS. 2A-2C, the direction of an air current or free stream is shown by an arrow and the velocity of the air current is shown by a letter U. In the case where the tripping wires are mounted on the periphery of circular cross-section of the flying body and spaced apart from each other by an equal distance of angle $\phi$, the patterns of tripping wire attachment are classified into following three types in view of the relationship between the direction of the air current and the tripping wire attaching position.

Type A: One tripping wire 3 is positioned on the cylindrical portion at a stagnation point P of the air current and other tripping wires 4 and 5 are spaced apart from the wire 3 by an angle $\phi$, respectively (FIG. 2A).

Type B: The tripping wires 6 and 7 are attached to the flying body at positions separated from the stagnation point P by an equiangular distance $\psi$ ($\psi = \frac{1}{2}\phi$), respectively (FIG. 2B).

Type C: The tripping wires 8 and 9 are attached to the flying body at positions separated from the stagnation point P by angles $\psi_1$ and $\psi_2$ ($\psi_1 \neq \psi_2$), respectively (FIG. 2C).

FIGS. 3A-3C show, by way of example, patterns of tripping wire attachment and notations thereof, respectively. (A): The notation "$\phi 30$-A(12)" shows that the pattern of tripping wire attachment belongs to Type A and that the twelve tripping wires are attached to the flying body so as to be spaced apart from each other by an angle of 30°. (B): The notation "$\psi 60$-B(2)" representing the pattern of FIG. 3B shows that the pattern of the tripping wire attachment belongs to Type B, that two tripping wires are spaced apart from each other by an angle of 120° and that the midpoint between adjacent two tripping wires is located to the stagnation point P. In this case azimuthal angle $\psi$ is 60°. (C): The notation "$\psi_1 75$-$\psi_2 15$-C(2)" representing the pattern of FIG. 3C shows that the pattern of the tripping wire arrangement belongs to Type C and that two tripping wires are attached to the flying body in such a manner that one of the wires is separated from the stagnation point P by an angle of 75° and the other by an angle of 15°. The shape in cross-section of the tripping wire shown in FIGS. 3A-3C is an n-sided polygon, particularly a pentagon.

Many experiments were carried out to verify the suppression or reduction of the occurrence of the asymmetric side force and the flat spin caused thereby with respect to various models of the flying body with a plurality of tripping wires each having a circular cross-section ($n = \infty$). These models are disposed in the air current at the high angle of attack to the flow direction of the stream. More concretely, the experiments were made by using a Göttingen type wind tunnel. In that case, the flying body model was supported at its center of gravity by a supporting rod in the free stream of the wind tunnel.

FIG. 4A shows an arrangement of the wind tunnel and the flying body model. In FIG. 4A, reference numeral 10 shows the wind tunnel apparatus by which flat spin caused by the asymmetric side force is simulated, 11 and 12 wind tunnels, 13 a supporting rod for the flying body 1 and 14 supporting members for measuring flat spin rate. Further, FIG. 4B is a diagrams showing dimensions of the various parts of the model used in the experiments, in which reference numeral 1A designates the cylindrical portion of the flying body, 1B the conical portion thereof and 15 a supporting point, that is, center of gravity of the flying body at which the flying body 1 is supported by the supporting rod 13. The dimensions of the model used are selected as follows: the entire length L of the flying body is 800 mm, the diameter D of the cylindrical portion 1A is 210 mm, the length l of the conical portion 1B is 305 mm and the distance $\overline{X}_G$ is 550 mm. Furthermore, the tripping wires having their diameters d of 1.5 mm, 2.0 mm and 3.0 mm, respectively, are used in the experiments so as to systematically change a height and position of the surface roughness. The experiments were carried out by using a 1.5 m$\phi$ Göttingen type wind tunnel and at a Reynolds number region of $2.0 \times 10^5$–$4.4 \times 10^5$.

The results of the wind tunnel experiments and the effects of the invention will be hereinafter be described.

(1) Flying Body with Two Tripping Wires

FIG. 5A is a diagram showing the results of the wind tunnel experiments for the model with two tripping wires, in which the ordinate shows side force coefficient $C_Y$, the positive or negative value of which represents a measure of the magnitude of the side force and the abscissa $R_e$ shows the Reynolds number. FIG. 5B is a diagram for showing pattern of tripping wire attachment on a flying body model used in the experiments. As seen from a curve A in FIG. 5A, there occurs the asymmetric side force in the case of the flying body with no surface roughness, that is, having no tripping wires attached thereto. However, in the case of the model "$\psi 60$-B(2)", the asymmetric side force is reduced as shown by a curve B in FIG. 5A. Further, it is seen from curves C–G in FIG. 5A that the asymmetric side force is not reduced in the case of other models "$\psi_1 75$-$\psi_2 45$-C(2)", "$\psi_1 90$-$\psi_2 30$-C(2)", "$\psi_1 105$-$\psi_2 15$-C(2)", "$\psi_1 120$-$\psi_2 0$-C(2)" and "$\psi_1 135$-$\psi_2(-15)$-C(2)". Further, it is known from the FIG. 5A that, when the two tripping wires are arranged asymmetrically with respect to the stagnation point P of the stream, the possibility of occurrence of the assymetric side force increases correspondingly.

FIG. 6A is a diagram showing one example of a flat spin rate, that is, number of rotation N of each of the models used in the respective experiments. In FIG. 6A, the ordinate shows the flat spin rate N (r.p.m.) and the abscissa shows the Reynolds number $R_e$. FIG. 6B is a diagram showing the type of the model used in the experiment. The used models belong to the Type B and thus have two tripping wires, the azimuthal angle for attachment $\psi$ being changed from 30° to 80°. In FIG. 6A, a curve A corresponds to the model having no surface roughness and curves B, C, D, E and F to those each having same surface roughness height: d=1.5 mm. Further, these models corresponding to the curves B, C, D, E and F are shown by the notations "$\psi 30$-B(2)", "$\psi 35$-B(2)", "$\psi 45$-B(2)", "$\psi 60$-B(2)" and "$\psi 80$-B(2)", respectively. From this experimental results shown in FIG. 6A, it is seen that, at and around azimuthal angles of 30° and 35°, the rotation of the models having surface roughness is rather encouraged. It may be estimated that this phenomenon is caused by the fact that, in the case of the small azimuthal angle for attachment $\psi$, the boundary layer once disturbed or tripped upstream flows downstream along the surface of the flying body and reattaches again to a downstream surface region, thereby causing asymmetric separation of the boundary layer. Due to this separation, the asymmetric side force occurs and therefore the flat spin begins. Then, the stagnation point of the stream having the resultant velocity of the free stream velocity and the circumferential velocity deviates from the original position. Due to the deviation, the flow pattern changes to the other flow pattern corresponding to the model of Type C (refer to FIG. 2C). Accordingly, the arrangement of two tripping wires disposed at azimuthal angles $\psi_1$ and $\psi_2$, respectively, would encourage the rotation of the model.

To the contrary, if the azimuthal angle $\psi$ is large, laminar separation occurs before the stream reaches the tripping wires, that is, before the boundary layer is tripped and, in this case, the flat spin begins. This phenomenon is similar to that in the case of the model with no surface roughness. For the comparison purpose, the experimental result for the model with no surface roughness is shown by a curve A in FIG. 6A.

In the case of the model with no surface roughness, that is, having no tripping wires, the flat spin rate N of the flying body caused by the asymmetric side force reaches 400 r.p.m.–500 r.p.m. at and near the Reynolds number of $3.5 \times 10^5$, as shown by the curve A in FIG. 6A. However, if the model is provided with at least two tripping wires, there is an optimal azimuthal angle for tripping wire attachment $\psi_{opt}$ which lowers the number of rotation, that is, flat spin rate down to approximately zero. Regarding this point, a description will hereinafter be given with reference to FIGS. 7A–7F. FIGS. 7A, 7C and 7E are diagrams, each showing the experimental result of the relationship between the flat spin rate, that is, number of rotation N of the model and the azimuthal angle $\psi$, in which the ordinate shows the flat spin rate N (r.p.m.) and the abscissa the azimuthal angle for attachment $\psi$(deg). Further, FIGS. 7A, 7C and 7E show the experimental results for the non-dimensional tripping wire height d of 0.007, 0.010 and 0.014, respectively. These wire heights d correspond to the wire diameters of 1.5 mm, 2.0 mm and 3.0 mm, respectively and are derived by normalizing the wire diameters by the model base diameter D, respectively. FIGS. 7B, 7D and 7F are diagrams, each showing a pattern of tripping wire attachment. As is seen from these figures, the models used in the experiments have two tripping wires which are attached to the cylindrical portion of the model in such a manner that the initial flow stagnation point lies on the midpoint between the two tripping wires. Accordingly, these models belong to the Type B shown in FIG. 2B. It is known from FIGS. 7A, 7C and 7E that the optimal azimuthal angles for attachment are approximately 60°, 50° and 45° for the non-dimensional wire heights of 0.007, 0.010 and 0.014, respectively. For the high surface roughness, the flow condition at the upstream region affects that at the downstream region, and thus it seems to be valid to estimate that the optimal azimuthal angle $\psi_{opt}$ decreases according as the tripping wire diameter increases. It should be noted that the experimental results shown by the curves A, B and C in the respective FIGS. 7A, 7C and 7E correspond to the Reynolds numbers of $2.6 \times 10^5$, $3.5 \times 10^5$ and $4.0 \times 10^5$, respectively.

(2) More than Two Tripping Wires Attachment on the Cylindrical Portion

With reference to FIGS. 8A and 8B, a description will hereinafter be given to experimental results in the case of the model which more than two tripping wires are attached to the cylindrical portion on its whole periphery and which the initial flow stagnation point may lie at any position on the periphery. FIGS. 8A and 8B are diagrams, each showing the experimental results of the relationship between the flat spin rate and the Reynolds number, in which the ordinate shows the flat spin rate, that is, number of the rotation N (r.p.m.) of the model and abscissa the Reynolds number $R_e$. Further, FIGS. 8A and 8B show the experimental results for the non-dimensional tripping wire heights d of 0.007 and 0.014, respectively. In FIG. 8A, a curve A shows a result for a model without surface roughness. Further, curves B, C, D, E, F, G, H and I show results for models designated by the notation "$\phi$60-A-WP(6)", "$\phi$60-B-WP(6)", "$\phi$45-A-WP(8)", "$\phi$45-B-WP(8)", "$\phi$30-A-WP(12)", "$\phi$30-B-WP(12)", "$\phi$15-A-WP(24)" and "$\phi$15-B-WP(24)", respectively. In these notations, the "WP" is an abbreviation of the words "whole periphery" and, by way of example, the notation "$\phi$60-A-WP(6)" means that the model used belongs to the Type A shown in FIG. 2A and that six tripping wires are attached to the cylindrical portion over the whole periphery in a manner to be spaced apart from each other by an equal distance of angle of 60°. In FIG. 8B, a curve A shows the result for a model without surface roughness and curves B and C for models designated by the notation "$\phi$45-A-WP(8)" and "$\phi$45-B-WP(8)", respectively.

It is known from the experimental results of FIGS. 8A and 8B that optimal angles for tripping wire attachment are 15° and 45° in the case of the non-dimensional wire heights d of 0.007 and 0.014, respectively, and that in that case the numbers of the tripping wires to be required are 24 and 8 correspondingly. It is known from the above-mentioned facts that, when the surface roughness height becomes higher, the distance of the angle between the adjacent tripping wires becomes larger correspondingly and accordingly the effect of the increase of the surface roughness height becomes more larger. Further, the change of the surface roughness height is accompanied with the change of the optimal angle for tripping wire attachment. This fact can be explained that the degree of the disturbance of the flow due to the tripping wires depends upon the surface roughness height.

(3) Tripping Wire Attachment only on the Conical Portion and Both on the Cylindrical and Conical Portions It may be estimated that, in the case of a model having the cylindrical and conical portions being combined with each other, the existence of the conical portion is significant and that, in the case of the model without surface roughness, the asymmetric side force occurs, thereby causing the flat spin even at the supercritical region for the cylindrical portion. In the experiments for the model of the tripping wire attachment only on the cylindrical portion, it is observed that, at the critical Reynolds number region, there is no occurrence of the asymmetric side force acting on the cylindrical portion and hence of the flat spin due to the side force but, at the supercritical Reynolds number region, there are some flat spin phenomena which are seemed to be caused by the existence of the conical portion having no tripping wires. One example of such flat spin phenomenon for the model of "$\psi$45-B(2)" is shown by a curve D in FIG. 6A.

FIG. 9A is a diagram showing the experimental results for the models with and without surface roughness on the conical portion. The models used in this experiment have a plurality of tripping wires arranged on the cylindrical portion and/or conical portion in a pattern of the notation "$\phi$30-A(12)", as shown in FIG. 9B. In FIG. 9A, the ordinate shows the flat spin rate N (r.p.m.) and the abscissa the Reynolds number $R_e$. Further, a curve A shows the result for the model without surface roughness, that is, without any spin alleviating or suppressing device, a curve B the result for the model with the tripping wires only on the cylindrical portion, a curve C the result for the model with the tripping wires only on the conical portion, and a curve D the result for the model with the tripping wires both on the cylindrical and conical portions. It is known from the experimental results shown in FIG. 9A that the surface roughness on the conical portion makes the critical Reynolds number lower and causes the considerably large flat spin rate at the lower Reynolds number region. However, it may be estimated that the effect of the surface roughness on the conical portion is not larger at the high Reynolds number region.

Accordingly, it is concluded at the Reynolds number region of $2.0 \times 10^5$–$4.4 \times 10^5$ that the asymmetric side force reducing effects and hence flat spin suppressing effects of the tripping wires attached only to the conical portion and both to the cylindrical and conical portions are inferior to those of the tripping wires attached only to the cylindrical portion.

(4) Relationship between the Number of Rotation and Moment of Rotation

Now, consider the relationship between the flat spin rate and the flat spin moment. When the model initially set in the stream so as to be of the Type B as shown in FIG. 2B begins to rotate for any reason, the current direction of the stream striking a surface area of the model between the adjacent two tripping wires changes from its original current direction with respect to the same surface area and therefore the model changes from Type B to Type C. It is impossible to perfectly simulate such condition as described above and to estimate flat spin moment from its result. Accordingly, the qualitative measurement of the flat spin moment was tried under such condition that $\psi_1 + \psi_2$ was held constant and that the current direction of the stream was changed variously. FIG. 10 shows the results of this measurement for the models in which d=1.5 mm and $\psi_1 + \psi_2 = 60°$. In FIG. 10, the ordinate shows the flat spin moment $C_n$ and the abscissa the Reynolds number $R_e$ and curves A, B, C, D and E correspond to the models of "$\psi$30-B(2)", "$\psi_1$45-$\psi_2$15-C(2)", "$\psi_1$60-$\psi_2$0-C(2)", "$\psi_1$75-$\psi_2$(-15)-C(2)" and "$\phi$15-B(25)", respectively. The flat spin moment $C_n$ around the supporting point of the model is small when $\psi_1$ and $\psi_2$ have equal values, but this moment increases when $\psi_1$ and $\psi_2$ become different from each other for any reason. This facts explain good the increase of the flat spin rate for the model "$\psi$30-B(2)" as shown by the curve B in FIG. 6A.

According to the above described results of the measurement, it is known that the flat spin moment at the high Reynolds number region is not so large and that the flat spin moment $C_n$ of the model having the tripping wires arranged over the whole periphery every angular distance of 15° is small and accordingly does not cause the flat spin.

As mentioned above, in accordance with a method and an apparatus of this invention, the suitable positions and numbers of the tripping wires to be attached to the outer periphery of the tubular, slender or elongated flying body are defined beforehand, so that it is possible to reduce the asymmetric side force acting on the flying body and to suppress the undesirable motion, for example, rotation thereof caused by the side force as well as, for example, the flat spin of a rocket being recovered at a relatively low velocity. Further, in accordance with the invention, it is also possible to prevent a tubular, slender or elongated body, which is moving in a wind blowing in the forward direction, from yawing due to the wind.

While the embodiments of the invention, as herein disclosed and described, constitute a preferred form, it is to be understood that other forms might be adopted.

What is claimed is:

1. A method of stabilizing flight of a flying body having a circular cross-section, comprising a step of suppressing undesirable motion of the flying body for stable flight of the flying body by reducing an asymmetric side force occurring when said flying body flies at a high angle of attack with respect to an air current by means of at least two tripping wires provided on the outer periphery of said flying body, wherein a number of said tripping wires is at least two and an initial stagnation point of the air current lies on a midpoint between said tripping wires on said outer periphery of said flying body, an optimal azimuthal angle for tripping wire position resides in a region from 15° to 60° for non-dimensional tripping wire height normalized by the diameter of said flying body residing in a region from 0.007 to 0.014.

2. The method according to claim 1, wherein in a case where a number of said tripping wires is two and said optimal azimuthal angle for tripping wire position resides in a region from 60° to 45°.

3. The method according to claim 1, wherein in a case where said tripping wires are provided on said flying body over its whole outer periphery in a manner to be spaced apart from each other by an equal distance of angle, an optimal distance of angle between the adjacent two tripping wires resides in a region from 15° to 45° for non-dimensional tripping wire height normalized by the diameter of said flying body residing in a region from 0.007 to 0.014 and a number of said tripping wires resides in a region from 24 to 8.

4. The method according to claim 1, wherein said flying body comprises a cylindrical portion and a conical portion and, for a Reynolds number region from $2 \times 10^5$ to $4.4 \times 10^5$, said tripping wires are only provided on said cylindrical portion.

5. A flight-stabilized flying body having a circular cross-section, comprising; a cylindrical portion, a conical portion and at least two tripping wires provided on the outer periphery of said cylindrical portion of said flying body, wherein an initial stagnation point of the air current lies on a midpoint between said tripping wires and said outer periphery of said flying body, an optimal azimuthal angle for tripping wire position resides in a region from 15° to 60° for non-dimensional tripping wire height normalized by the diameter of said flying body residing in a region from 0.007 to 0.014, and a Reynolds number region is from $2 \times 10^5$ to $4.4 \times 10^5$, thereby reducing an asymmetric side force occurring when said flying body flies at a high angle of attack with respect to an air current so as to suppress bad motion of said flying body caused by said asymmetric side force for stable flight of said flying body.

6. The flight-stabilized flying body according to claim 5, wherein in a case where a number of said tripping wires is two and an initial stagnation point of the air current lies on a midpoint between said tripping wires and on said outer periphery of said flying body, an optimal azimuthal angle for tripping wire position resides in a region from 60° to 45° for non-dimensional tripping wire height normalized by the diameter of said flying body residing in a region from 0.007 to 0.014.

7. The flight-stabilized flying body according to claim 5, wherein in a case where said tripping wires and provided on said flying body over its whole outer periphery in a manner to be spaced apart from each other by an equal distance of angle, an optimal distance of angle between the adjacent two tripping wires resides in a region from 15° to 45° for non-dimensional tripping wire height normalized by the diameter of said flying body residing in a region from 0.007 to 0.014 and a number of said tripping wires resides in a region from 24 to 8.

* * * * *